(12) United States Patent
Zhang

(10) Patent No.: US 9,798,191 B2
(45) Date of Patent: Oct. 24, 2017

(54) METHOD FOR FORMING ALIGNMENT FILM AND LIQUID CRYSTAL DISPLAY

(71) Applicant: Shenzhen China Star Optoelectronics Technology Co., Ltd., Shenzhen, Guangdong (CN)

(72) Inventor: Weiji Zhang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 142 days.

(21) Appl. No.: 14/785,841

(22) PCT Filed: Aug. 18, 2015

(86) PCT No.: PCT/CN2015/087372
§ 371 (c)(1),
(2) Date: Oct. 20, 2015

(87) PCT Pub. No.: WO2016/192210
PCT Pub. Date: Dec. 8, 2016

(65) Prior Publication Data
US 2017/0108727 A1    Apr. 20, 2017

(30) Foreign Application Priority Data

Jun. 5, 2015    (CN) .......................... 201510307124

(51) Int. Cl.
*G02F 1/1337*    (2006.01)
(52) U.S. Cl.
CPC .... *G02F 1/13378* (2013.01); *G02F 2201/121* (2013.01)
(58) Field of Classification Search
CPC .................. G02F 1/13378; G02F 2201/121
USPC ..................................................... 349/123
See application file for complete search history.

*Primary Examiner* — Hoan C Nguyen
(74) *Attorney, Agent, or Firm* — Andrew C. Cheng

(57) ABSTRACT

The invention provides a method for forming an alignment film and a liquid crystal display. The method for forming an alignment film includes: providing a substrate, the substrate including a display region and a non-display region, the display region with a plurality of sides, a corner formed by two adjacent sides, the non-display region disposed to surround the display region; disposing a first alignment liquid on the display region of the substrate; disposing a second alignment liquid on the non-display region of the substrate and surrounding corners of the display region; toasting the first alignment liquid and the second alignment liquid to form an alignment film.

13 Claims, 5 Drawing Sheets

METHOD FOR FORMING ALIGNMENT FILM AND LIQUID CRYSTAL DISPLAY

CROSS REFERENCE

The invention claims priority from application No. CN201510307124.9, which is filed Jun. 5, 2015 and entitled "Method for forming alignment film and liquid crystal display", the above-identified patent application is incorporated herein by reference in its entirety.

FIELD OF THE INVENTION

The invention relates to the field of flat panel display technique, and more particularly to a method for forming an alignment film and a liquid crystal display.

BACKGROUND OF THE INVENTION

A liquid crystal display (LCD) is prevalent and win favor of the public due to advantages such as low energy consumption, small dimension and lightweight. A liquid crystal display can include a liquid crystal display panel, the liquid crystal display panel includes an alignment film, and the alignment film can provide a pre-tilt angle to a liquid crystal molecule so as to better consistency of rotation directions of liquid crystal molecules. An alignment film can be formed by solidification of an alignment liquid, since solid content in an alignment liquid and viscosity are low, an alignment liquid is able to flow, therefore, when the alignment liquid sprays paint or drops onto a rectangular substrate, the alignment liquid will scatter, which can cause four corners of a solidified alignment film to be round. With the enhancement of narrow frames, when requiring space between the alignment film and edge of the display region of the liquid crystal panel to be narrow, an alignment film is impossible to be formed on corners of the display region of the a liquid crystal display panel because the alignment film corresponding to corners of the display region is round, which leads to failure of formation of alignment film on the corners of the display region of a liquid crystal display panel and inconsistency of rotation directions of liquid crystal molecules corresponding to corners of the display region of a liquid crystal display panel, resulting in low quality of the liquid crystal display panel.

SUMMARY OF THE INVENTION

The invention provides a method for forming an alignment film, the method for forming an alignment film includes:

providing a substrate, the substrate including a display region and a non-display region, the display region with a plurality of sides, a corner formed by two adjacent sides, the non-display region disposed to surround the display region;

disposing a first alignment liquid on the display region of the substrate;

disposing a second alignment liquid on the non-display region of the substrate and surrounding corners of the display region;

toasting the first alignment liquid and the second alignment liquid to form an alignment film.

The non-display region of the substrate has a first triangle region and a second triangle region surrounding the corners of the display region, the first triangle region has a first side, a second side and a third side, the second triangle region includes a fourth side, a fifth side and a sixth side, the first side and the fourth side are disposed on a diagonal line penetrating the corner of the display region, the second side and the fifth side are disposed respectively on two sides that form the corner;

disposing the second alignment liquid on the non-display region of the substrate and surrounding corners of the display region includes:

disposing the second alignment liquid on the first triangle region and the second triangle region of the non-display region.

Lengths of the first side and the fourth side are equal, and the length of the first side and the fourth side AP is equal to $AR[(2)^{1/2}-1]$, where AR is 1.5 mm~2.5 mm.

Length of the second side AX and length of the fifth side AY are both equal to $(AR-AP)(2)^{1/2}$.

The first alignment liquid includes a plurality of alignment drops, the alignment drops are distributed in the display region in a form of matrix.

Shapes of regions formed by the second alignment liquid surrounding the corners of the display region are different.

Shapes of regions formed by the second alignment liquid surrounding the corners of the display region are the same.

The method further includes a step between the step that "providing the substrate, the substrate comprising a display region and a non-display region, wherein the display region has a plurality of sides, a corner is formed by two adjacent sides, the non-display region is disposed to surround the display region" and the step that "a first alignment liquid is disposed on the display region of the substrate", which includes:

the substrate comprising a surface, forming a conductive layer on the surface;

the step "a first alignment liquid is disposed on the display region of the substrate" includes:

disposing the first alignment liquid on the conductive layer corresponding to the display region.

The conductive layer is a common electrode layer.

The alignment liquid drops onto the rectangular substrate and scatters according to conventional technique, which can cause frame of solidified alignment film to be round. A second alignment liquid of corners surrounding the display region is disposed on the non-display region according to the invention, as the second alignment liquid can offset the first alignment liquid disposed on the corners of the display region and avoid the formation of round corners surrounding the alignment film after flow and solidification of the first alignment liquid and the second alignment liquid. Therefore, the alignment film formed by the method provided by the invention can satisfy the requirement of narrow frames, and the display region is fully covered by the alignment film, which can better the consistency of rotation directions of liquid crystal molecules corresponding to the display region and improve the quality of a liquid crystal display panel.

The invention also provides a liquid crystal display, including two substrates and a liquid crystal layer disposed between the two substrates, the substrate includes a display region and a non-display region, the display region has a plurality of sides, a corner is formed by two adjacent sides, the non-display region is disposed to surround the display region;

a first alignment film is disposed on the display region of the substrate;

a second alignment film is disposed on the non-display region of the substrate and surrounds the corners of the display region.

The non-display region of the substrate has a first triangle region and a second triangle region surrounding the corners the of display region, the first triangle region has a first side, a second side and a third side, the second triangle region includes a fourth side, a fifth side and a sixth side, the first side and the fourth side are disposed on a diagonal line penetrating the corners of the display region, the second side and the fifth side are disposed respectively on two sides that form the corner, the second alignment film is disposed in the first triangle region and the second triangle region.

Lengths of the first side and the fourth side are equal, and the length of the first side and the fourth side AP is equal to $AR[(2)^{1/2}-1]$, where AR is 1.5 mm~2.5 mm.

Length of the second side AX and length of the fifth side AY are both equal to $(AR-AP)(2)^{1/2}$.

Shapes of regions formed by the second alignment liquid surrounding the corners of the display region are different.

Shapes of regions formed by the second alignment liquid surrounding the corners of the display region are the same.

The substrate includes a surface, a conductive layer is formed on the surface, and the first alignment film is disposed on the conductive layer corresponding to the display region.

The conductive layer is a common electrode layer.

BRIEF DESCRIPTION OF THE DRAWINGS

For further description of the proposal of the invention or conventional technique, figures of exemplary embodiments or conventional technique are referred to illustrate, obviously, the following figures are merely detailed description of the preferred embodiments, for those skilled persons in the art, various modifications and variations can be made according to the figures of the invention.

DETAILED DESCRIPTION OF THE DRAWINGS

In the following detailed description of the preferred embodiments, reference is made to the accompanying drawings which form a part hereof, and in which is shown by way of illustration specific embodiments in which the invention may be practiced. For those skilled persons in the art, various modifications and variations can be made according to the invention, and therefore the invention needs not be limited to the disclosed embodiment.

Figure 1:
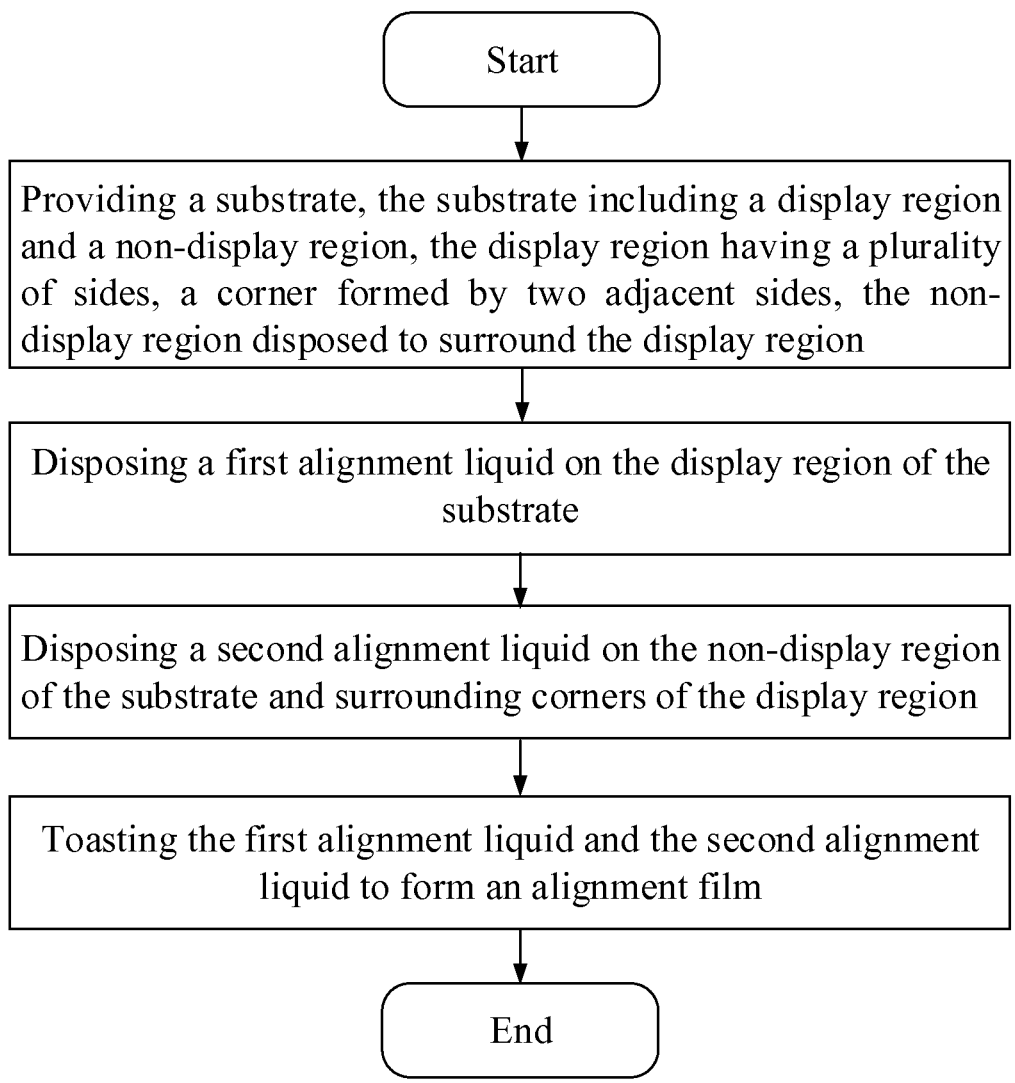
FIG. 1 is a flow chart of a method for forming an alignment film according to a preferred embodiment of the invention.
Figure 2:
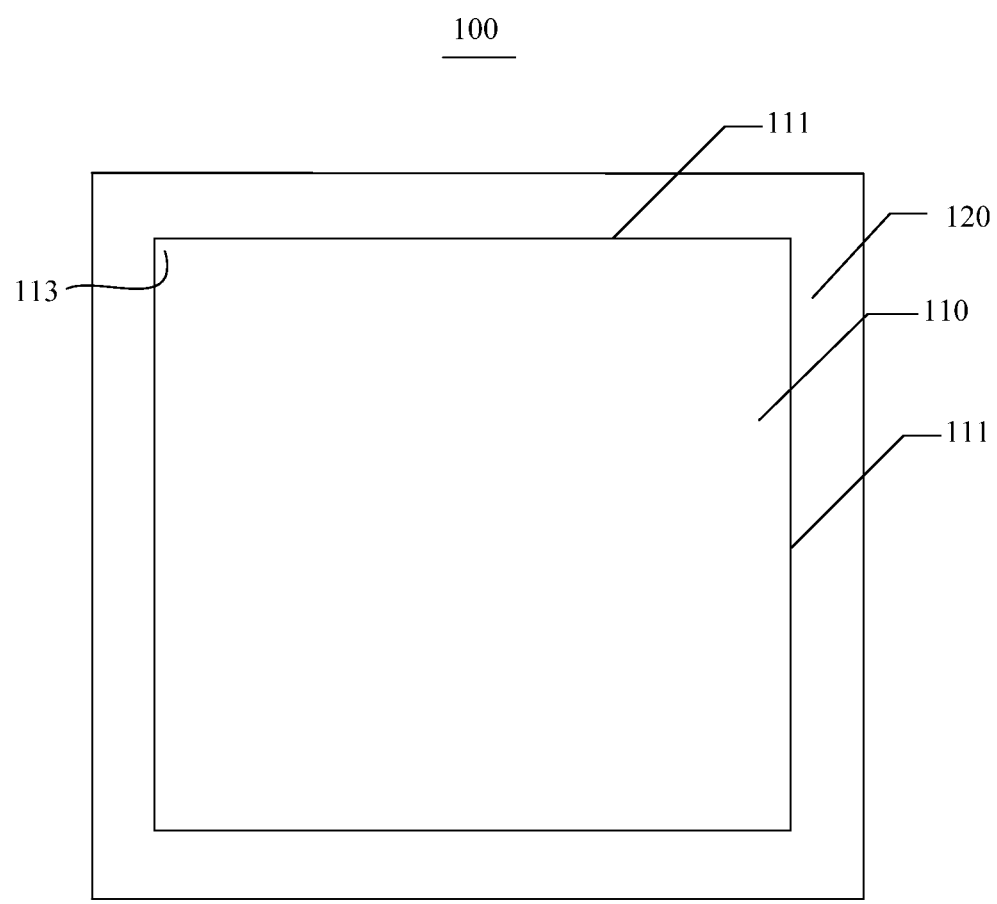
FIG. 2 to FIG. 5 are schematic views corresponding to steps of the method for forming an alignment film in FIG. 1.
Figure 3:
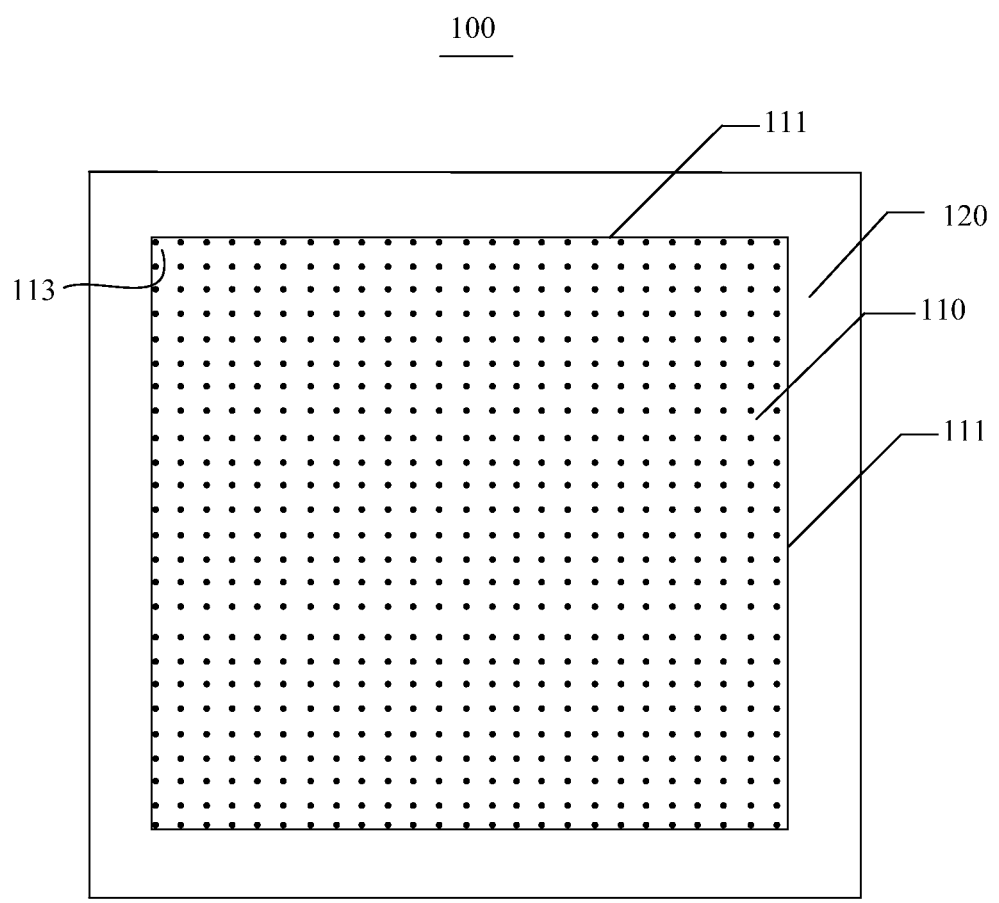
Figure 4:
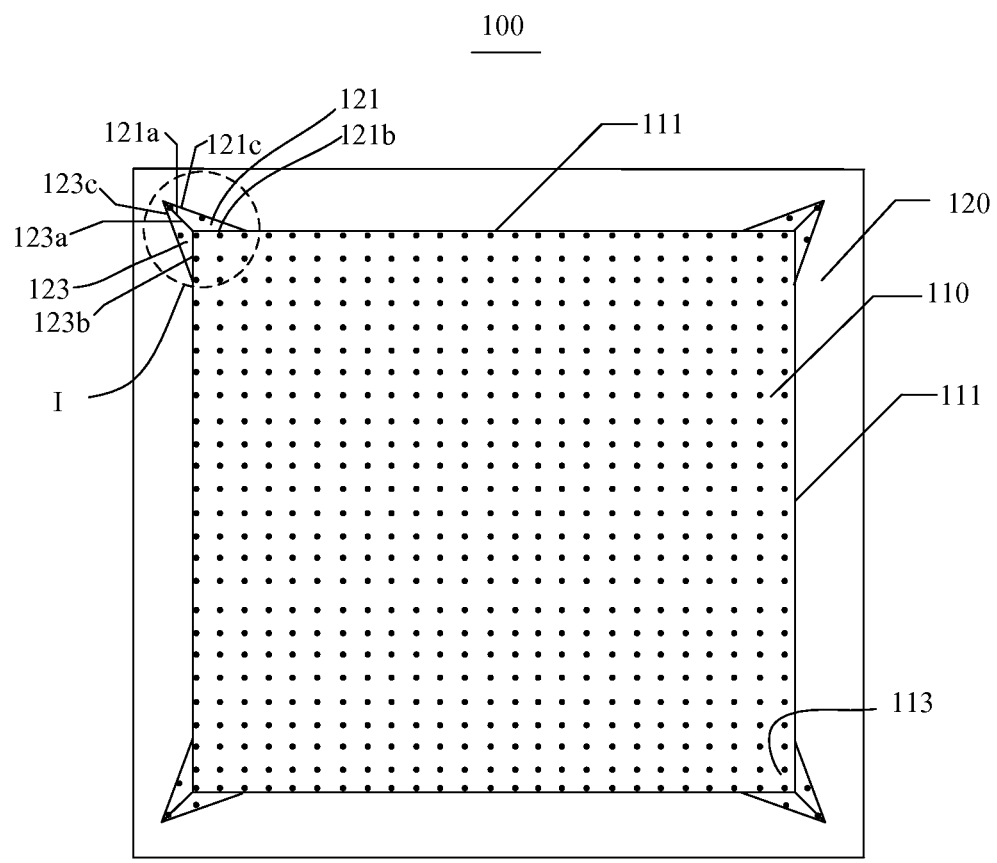
Figure 5:
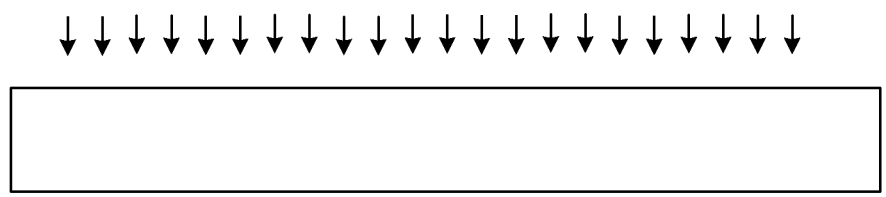
Figure 6:
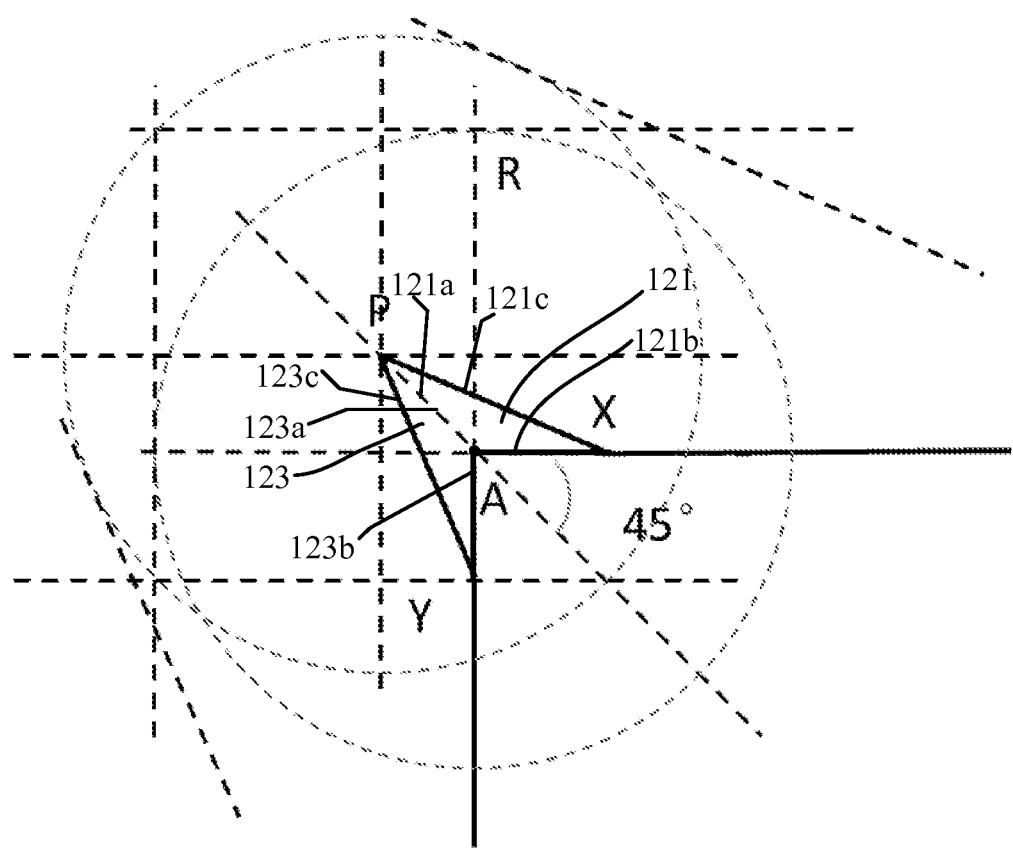
FIG. 6 is an enlarged schematic view of part I in FIG. 5.

Referring to FIG. 1, FIG. 1 is a flow chart of a method for forming an alignment film according to a preferred embodiment of the invention. The alignment film is applied in a liquid crystal display panel to provide a pre-tilt angle for liquid crystal molecules, so as to achieve better consistency of rotation directions of liquid crystal molecules. The method for forming an alignment film includes but not limited to the following steps.

Step S101, providing a substrate 100, the substrate 100 includes a display region 110 and a non-display region 120, the display region 110 has a plurality of sides 111, each corner 113 is formed by two adjacent sides 111, the non-display region 120 is disposed to surround the display region 110.

Step S102, disposing a first alignment liquid on the display region 110 of the substrate 100.

Step S103, disposing a second alignment liquid on the non-display region 120 of the substrate 100 and surrounding the corners 113 of the display region 110. Accordingly, in the exemplary embodiment, the first alignment liquid and the second alignment liquid are merely for distinguishing alignment liquids disposed on the display region 110 and the non-display region 120, ingredients of the first alignment liquid and the second alignment liquid can be equal or not, which are without limitation. Accordingly, though in the exemplary embodiment, disposition of the first alignment liquid and disposition of the second alignment liquid are separated in different steps, no limitation of the order for disposing the first alignment liquid and the second alignment liquid is induced. In an exemplary embodiment, the first alignment liquid can be disposed on the display region 110 of the substrate 100, then a second alignment liquid is disposed surrounding the corners 113 of the display region 110 on the non-display region 120 of the substrate 100. In another exemplary embodiment, the second alignment liquid can be disposed surrounding the corners 113 of the display region 110 on the non-display region 120 of the substrate 100, then the first alignment liquid is disposed on the display region 110 of the substrate 100. In another exemplary embodiment, disposing the first alignment liquid on the display region 110 of the substrate 100 and disposing the second alignment liquid surrounding the corners 113 of the display region 110 on the non-display region 120 of the substrate 100 can be simultaneous.

Step S104, toasting the first alignment liquid and the second alignment liquid to form an alignment film. An alignment film is formed by the first alignment liquid and the second alignment liquid after being toasted.

In an exemplary embodiment, the non-display region 120 of the substrate 110 has a first triangle region 121 and a second triangle region 123 surrounding the corners 113 of the display region 110. The first triangle region 121 has a first side 121a, a second side 121b and a third side 121c, the second triangle region 123 includes a fourth side 123a, a fifth side 123b and a sixth side 123c. The first side 121a, the second side 121b and the third side 121c are connected in sequence to form a triangle region, the fourth side 123a, the fifth side 123b and the sixth side 123c are connected in sequence to form a triangle region. The first side 121a and the fourth side 123a are disposed on a diagonal line penetrating the corresponding corner 113 of the display region 110, the second side 121b and the fifth side 123b are disposed respectively on two sides 111 of the corner 113. One end of the third side 121c is disposed on the side 111, the other end is disposed on a diagonal line penetrating the corresponding corner 113 of the display region 110, one end of the sixth side 123c is disposed on the side 111, the other end is disposed on a diagonal line penetrating the corresponding corner 113 of the display region 110. The "Step S103, disposing a second alignment liquid on the non-display region 120 of the substrate 100 and surrounding the corners 113 of the display region 110" includes: disposing the second alignment liquid on the first triangle region 121 and the second triangle region 123 of the non-display region 120.

In the exemplary embodiment, lengths of the first side 121a and the fourth side 123a are equal and the first side 121a and the fourth side 123a are lapping, for the convenience of description, length of the first side 121a and the fourth side 123a is named AP, $AP=AR[(2)^{1/2}-1]$, when an alignment liquid drops onto the substrate 100, the alignment liquid extends to form an arc, radius of a circle including the arc is AR, AR relates to viscosity of the alignment liquid, solid content, material of the substrate dropped on and roughness of the surface. During the manufacture process of a liquid crystal display panel, AR can be 1.5 mm~2.5 mm. Taking an example that viscosity of the first alignment liquid and the second alignment liquid is 7CP and solid content is 3.5%, AR is 2.2 mm when dropping the first alignment liquid and the second alignment on surface of Indium Tin Oxide (ITO).

Length of the second side 121$b$ AX and length of the fifth side 123$b$ AY are equal, AX=AY=(AR−AP) $(2)^{1/2}$.

The first alignment liquid includes a plurality of alignment drops, the alignment drops are distributed in the display region 110 in a form of matrix.

Accordingly, though previously taking the example that the non-display region 120 of the substrate 110 has the first triangle region 121 and the second triangle region 123 surrounding the corners 113 of the display region 110 and three sides of the first triangle region 121 and that of the second triangle 123 have certain relation. Accordingly, the previous exemplary embodiment is merely a preferred embodiment, in other embodiments, the first triangle region 121 and the second triangle region 123 can be independent. In an exemplary embodiment, shapes of regions formed by the second alignment liquid surrounding the corners 113 of the display region 110 are different. In another exemplary embodiment, shapes of regions formed by the second alignment liquid surrounding the corners 113 of the display region 110 are the same.

Preferably, the following step is between Step S101 and Step S102.

Step 1, the substrate 100 includes a surface, a conductive layer is formed on the surface. Then the step S102, disposing a first alignment liquid on the display region 110 of the substrate 100 includes: disposing the first alignment liquid on the conductive layer corresponding to the display region 110. In an exemplary embodiment, the conductive layer is a common electrode layer, material of the conductive layer can be but not limited to Indium Tin Oxide.

The alignment liquid drops onto the rectangular substrate and scatters according to conventional technique, which can cause frame of solidified alignment film to be round. Second alignment liquid surrounding the corners 113 of the display region 110 are disposed on the non-display region 120 according to the invention, as the second alignment liquid can offset the first alignment liquid disposed on the corners 113 of the display region 110 and avoid the formation of round corners surrounding the alignment film after flow and solidification of the first alignment liquid and the second alignment liquid. Therefore, the alignment film formed by the method provided by the invention can satisfy the requirement of narrow frames, and the display region 110 is fully covered by the alignment film, which can better the consistency of rotation directions of liquid crystal molecules corresponding to the display region 110 and improve the quality of a liquid crystal display panel.

The embodiments are preferred chosen and described in order to best explain the present invention. Many modifications and variations will be apparent to practitioners skilled in this art so it is not intended to be exhaustive or to limit the invention to the precise form or to exemplary embodiments disclosed. It is intended that the scope of the invention is defined by the claims appended hereto and their equivalents in which all terms are meant in their broadest reasonable sense unless otherwise indicated.

What is claimed is:

1. A method for forming an alignment film, comprising:
    providing a substrate, the substrate comprising a display region and a non-display region, wherein the display region has a plurality of sides, a corner is formed by two adjacent sides, the non-display region is disposed to surround the display region;
    disposing a first alignment liquid on the display region of the substrate;
    disposing a second alignment liquid on the non-display region of the substrate and surrounding corners of the display region;
    toasting the first alignment liquid and the second alignment liquid to form an alignment film;
    wherein the non-display region of the substrate has a first triangle region and a second triangle region surrounding the corners of the display region, wherein the first triangle region has a first side, a second side and a third side, the second triangle region comprises a fourth side, a fifth side and a sixth side, the first side and the fourth side are disposed on a diagonal line penetrating the corners of the display region, the second side and the fifth side are disposed respectively on two sides of the corner;
    disposing the second alignment liquid on the non-display region of the substrate and surrounding corners of the display region comprising:
    disposing the second alignment liquid on the first triangle region and the second triangle region of the non-display region;
    wherein lengths of the first side and the fourth side are equal, and the length of the first side and the fourth side AP is equal to AR$[(2)^{1/2}−1]$, where AR is 1.5 mm~2.5 mm.

2. The method for forming an alignment film according to claim 1, wherein length of the second side AX and length of the fifth side AY are both equal to (AR−AP) $(2)^{1/2}$.

3. The method for forming an alignment film according to claim 1, wherein the first alignment liquid is disposed on the substrate in a form of a plurality of alignment drops, the alignment drops are distributed in the display region in a form of matrix.

4. The method for forming an alignment film according to claim 1, wherein shapes of regions formed by the second alignment liquid surrounding the corners of the display region are different.

5. The method for forming an alignment film according to claim 1, wherein shapes of regions formed by the second alignment liquid surrounding the corners of the display region are the same.

6. The method for forming an alignment film according to claim 1, wherein the method further comprises a step between the step of "providing the substrate, the substrate comprising a display region and a non-display region, wherein the display region has a plurality of sides, a corner is formed by two adjacent sides, the non-display region is disposed to surround the display region" and the step of "a first alignment liquid is disposed on the display region of the substrate", which comprises:
    the substrate comprising a surface, forming a conductive layer on the surface;
    the step "a first alignment liquid is disposed on the display region of the substrate" comprises:
    disposing the first alignment liquid on the conductive layer corresponding to the display region.

7. The method for forming an alignment film according to claim 6, wherein the conductive layer is a common electrode layer.

8. A liquid crystal display, comprising two substrates and a liquid crystal layer disposed between the two substrates, wherein the substrate comprises a display region and a non-display region, the display region has a plurality of sides, a corner is formed by two adjacent sides, the non-display region is disposed to surround the display region;

a first alignment layer is disposed on the display region of the substrate;

a second alignment film is disposed on the non-display region of the substrate and surrounds corners of the display region;

wherein the non-display region of the substrate has the first triangle region and the second triangle region surrounding the corners of the display region, wherein the first triangle region has a first side, a second side and a third side, the second triangle region comprises a fourth side, a fifth side and a sixth side, the first side and the fourth side are disposed on a diagonal line penetrating the corner of the display region, the second side and the fifth side are disposed respectively on two sides of the corner, the second alignment film is disposed on the first triangle region and the second triangle region;

wherein lengths of the first side and the fourth side are equal, and the length of the first side and the fourth side AP is equal to $AR[(2)^{1/2}-1]$, where AR is 1.5 mm~2.5 mm.

9. The liquid crystal display according to claim 8, wherein length of the second side AX and length of the fifth side AY are both equal to $(AR-AP)(2)^{1/2}$.

10. The liquid crystal display according to claim 8, wherein shapes of regions formed by the second alignment liquid surrounding corners of the display region are different.

11. The liquid crystal display according to claim 8, wherein shapes of regions formed by the second alignment liquid surrounding corners of the display region are the same.

12. The liquid crystal display according to claim 8, wherein the substrate comprises a surface, a conductive layer is formed on the surface, the first alignment film is disposed on the conductive layer corresponding to the display region.

13. The liquid crystal display according to claim 12, wherein the conductive layer is a common electrode layer.

* * * * *